United States Patent Office.

WILLIAM G. LUXTON, OF LIVERPOOL, ENGLAND, ASSIGNOR TO THE UNITED ALKALI COMPANY, LIMITED, OF SAME PLACE.

DIAPHRAGM FOR ELECTROLYTIC PURPOSES.

SPECIFICATION forming part of Letters Patent No. 609,745, dated August 23, 1898.

Application filed April 9, 1898. Serial No. 677,072. (No model.)

*To all whom it may concern:*

Be it known that I, WILLIAM GEORGE LUXTON, laboratory assistant, a subject of the Queen of Great Britain and Ireland, and a resident of G 11 Exchange Buildings, Liverpool, in the county of Lancaster, England, have invented certain new and useful Improvements in Diaphragms for Electrolytic Purposes, (for which I have, in conjunction with the United Alkali Company, Limited, of Liverpool, aforesaid, applied for a patent in Great Britain, No. 6,526, dated March 17, 1898,) of which the following is a specification.

The use of cement in the manufacture of diaphragms for electrolytic purposes has long been known. Experience, however, has shown that the use of cement alone possesses disadvantages due to an insufficient porosity. Attempts have been made to overcome this objection by various inventors, to whom patents have been granted. The principle involved has consisted in the addition to the cement of some porous material or of some other substance not porous, but which could at a later stage be removed, either during or after the setting of the cement. The substances employed for such addition have been soluble salts, which are removed by washing out, or they have been substances which can be decomposed by the electrolyte, leaving in all cases the cement in a porous condition. The use of the aforesaid substances, as hitherto proposed, has, however, presented certain disadvantages which it is the object of this invention to overcome by providing porous diaphragms, which are very cheap in first cost, strong and durable in use, and at the same time as efficient as those hitherto made by the more expensive processes referred to.

According to this invention the diaphragms are formed of a mixture with water of cement, such as Portland cement, and a porous material—such as gypsum, lime, coke, cinders, or the like—and a non-porous material, such as ordinary sand. The sand may be common sea-sand and the porous material may be, for example, the waste cinders from the works, which can be reduced in a mill to a small size. Suitable proportions are three parts (by volume) of both the cement and porous material to two parts of sea-sand. The whole is thoroughly incorporated with water to make a pasty mass and then made into the form of plates or used to line electrolytic cells, and when set the diaphragm presents a combination of pores through the substance of the porous material and of interstices between the cement and sand and other particles due to the contraction of the cement in drying or setting. The diaphragms are not only cheap in production, but are made with great facility and are very strong and durable in use.

Having now particularly described and ascertained the nature of this invention and in what manner the same is to be performed, it is declared that what is claimed is—

A diaphragm made of a composition of cement, sand, and a porous material mixed with water and allowed to dry, or set, said diaphragm having pores through the substance of the porous material and interstices between the cement and the other constituent particles substantially as hereinbefore described.

In testimony whereof I have signed this specification in the presence of two subscribing witnesses.

W. G. LUXTON.

Witnesses:
   CHARLES COLLINS,
   CHARLES PHILLIPS.